Oct. 6, 1970    M. WIENAND    3,532,779
PROCESS FOR THE PREPARATION OF MOLDED ARTICLES
OF THERMOPLASTIC MATERIAL
Filed March 19, 1965

INVENTOR
MICHAEL WIENAND
BY Dicke & Craig
ATTORNEYS

United States Patent Office 3,532,779
Patented Oct. 6, 1970

3,532,779
PROCESS FOR THE PREPARATION OF MOLDED ARTICLES OF THERMOPLASTIC MATERIAL
Michael Wienand, Siegburg, Germany, assignor to Dynamit Nobel Aktiengesellschaft, Troisdorf, Germany
Filed Mar. 19, 1965, Ser. No. 441,036
Claims priority, application Germany, Mar. 21, 1964, D 43,961
Int. Cl. B29c 17/04
U.S. Cl. 264—90                                   11 Claims

ABSTRACT OF THE DISCLOSURE

The present disclosure is directed to a process for the preparation of molded articles of thermoplastic material having a glass fiber-synthetic resin reinforcement internal core. The present disclosure is based upon the concept that the glass fiber filler or core insert is initially anchored with the surfaces of the thermoplastic materials, said thermoplastic materials serving as the outer covering layers for the glass fiber insert. A synthetic resin is then introduced into the interstices between the glass fibers and said glass fibers are thereby anchored into the surfaces of the thermoplastic materials during the hardening of the synthetic resin.

---

This invention relates to a process for the preparation of molded articles of thermoplastic material. More particularly, it relates to a process for the preparation of molded articles of thermoplastic material having a glass fiber-synthetic resin reinforcement. Even more particularly, it relates to a process for the preparation of molded articles of thermoplastic material having a glass fiber-cold-hardening synthetic resin reinforcement, wherein an effective and durable bond between the thermoplastic material and the applied synthetic resin is obtained by means of the glass fibers.

Thermoplastic materials have properties which make them particularly suitable for use for many purposes. Such a useful property is, for example, their resistance to acid. In actual practice, however, the use of thermoplastic materials is often rendered impossible or is greatly impeded because of the fact that, under increasing temperature, they progressively lose the ability to retain their shape. Thin-walled molded articles, such as containers for acids and oils or vats and tubs for medicinial baths, are particularly generally made either from glass fiber-reinforced synthetic resins or from a thermoplastic material having a glass fiber-reinforced synthetic resin applied thereon.

The molding technique and manual application processes employed heretofore for the manufacture of such molded parts or articles are, however, expensive and/or time-consuming. This is so because in the molding techniques or processes employed in the prior art expensive steel molds are required for the high operating pressures required. With the manual application process, the molds, while being cheaper, are required to be in use for each individual part until that part is completely hardened. However, it takes a relatively long time to harden each individual part in this process.

If it is desired to apply the glass fiber-reinforced layer of synthetic resin to the thermoplastic material, a further difficulty arises in assuring a sufficient adhesion between the thermoplastic material and the applied synthetic resin. Since these materials do not possess properties tending to result in a good bond therebetween a priori, it becomes necessary to employ adhesive agents, such as glues, solvents, swelling agents and the like, to effect this purpose. However, the use of these materials brings on the danger that the thermoplastic material will become warped and brittle during the drying of the adhesive agent utilized.

One of the objects of the present invention is to provide a process for the preparation of molded articles of thermoplastic material having a glass fiber-synthetic resin reinforcement which overcomes the disadvantages and deficiencies of the prior art.

Another object of the present invention is to provide a process for the preparation of molded articles of thermoplastic material having a glass fiber-synthetic resin reinforcement which results in a strong and effective adhesive bond between the thermoplastic material and the applied synthetic resin.

A further object of the invention is to provide a process for the preparation of molded articles of thermoplastic material having a glass fiber-synthetic resin reinforcement which gives molded parts or particles having highly improved properties, such as impact resistance, as compared to those made by the prior art methods.

A still further object of the invention is to provide a process for the preparation of molded articles of thermoplastic material having a glass fiber-synthetic resin reinforcement which may be carried out effectively and in an economical and efficient manner.

These and other objects of the present invention will become apparent to those skilled in the art from a reading of the following specification and claims.

Accordingly, pursuant to the process of the present invention, it has been found that the aforementioned disadvantages and drawbacks may be eliminated and an effective process for the preparation of molded articles of thermoplastic material having a glass fiber-synthetic resin reinforcement may be effected if the procedure detailed hereinbelow is followed. In accordance with the present invention, this new procedure comprises taking two essentially coinciding parts of thermoplastic material, particularly sheets thereof, which intimately touch one another along their entire edges except for two apertures which form a hollow space with each other and inserting into said hollow space a liner or filler of glass fibers and filling the hollow space therewith. This combination is then squeezed off or pressed under pressure at such a temperature that the surfaces of the resin adjacent to the glass fiber lining or filler are converted into a plastic or softened condition. After cooling of the thermoplastic material parts to a temperature below the plastic or softening range of the thermoplastic and, if desired, after a deformation of the resultant combination by deep-drawing, the glass fiber-filled hollow space is completely filled with a cold-hardening synthetic resin by the use of pressure and/or vacuum over either one or both apertures.

In contrast to the known prior art processes, the process of the present invention involves inserting the cold-hardening synthetic resin between the thermoplastic parts such that it acts as the carrying and supporting core, rather than applying the synthetic resin as an outer covering layer. Thus, the present invention is based upon the concept that the glass fiber filler or insert is initially anchored with the surfaces of the thermoplastic materials which are brought into contact with each other and thus which really serve as outer covering layers for the glass fiber insert. Then, the glass fibers are thereafter anchored into said surfaces during the hardening of the synthetic resin which has been introduced into the interstices between the glass fibers.

Despite the fact that the thermoplastic material does not have the property of directly adhering in a good adhesive bond or connection with the cold-hardening synthetic resin, a good and durable bond between the thermoplastic material and said synthetic resin is thus obtained by means of a glass fiber filler in accordance with the process of the present invention, without the use of glues or other adhesive agents. Hence, an article or body may be produced thereby which not only displays at the outer surfaces thereof the desirable properties of the thermoplastic material, such as, for example, the chemical resistance thereof, but also displays a desired inherent form-stability under stresses at high temperatures because of the supporting glass fiber-reinforced synthetic resin core therein.

It is, of course, completely immaterial as to the exact shape of the two thermoplastic parts brought together. The two thermoplastic parts for receiving the glass fiber filler may be pre-shaped or they may be shaped in the desired manner together with the glass fiber filler after the introduction of the latter, for example, during the squeezing off operation described hereinabove. The end result is also unaffected by whether the two parts of thermoplastic material are softened or plasticized at the inner surfaces thereof prior to or subsequent to the insertion of the glass fiber filler.

In order to prevent any synthetic resin from flowing out of the hollow space between the edges of the two thermoplastic parts at an undesired spot during the pouring or filling operation, which would result in a loss or waste of this material, a further embodiment of the present invention provides that the two thermoplastic parts be held tightly together along the edges thereof. This may be achieved, for example, by welding the two thermoplastic parts together to each other along the common edge thereof. They may, however, be held together by means of a suitable device, for example, by means of a clamping frame or the like, until the synthetic resin has been brought in or inserted between the two thermoplastic parts and has been hardened. If this embodiment of the invention is employed, it must be carried out prior to the introduction of the synthetic resin. Such a welding or clamping operation may, of course, carried out at any desired time prior to the pouring or filling operation.

In order to introduce the synthetic resin into the glass fiber-filled inner space between the thermoplastic parts in an easy and efficacious manner and particulary without waste, it is advisable to provide one of the two apertures arranged at the edge of the thermoplastic parts as an inlet or filling vent, for example, for the connection of a filling pump thereto and/or to have the other aperture act as a suction vent or tube, for example, for the connection of a vacuum pump thereto. This latter feature will depend upon whether the introduction of the synthetic resin is to be effected by the use of pressure or of vacuum.

Particular conditions of temperature and pressure employed during the process of the present invention are not critical and may be easily ascertained by those skilled in the art. It is obvious that the temperature of the cold-hardening synthetic resin introduced and the pressure and/or vacuum utilized be chosen and controlled in such a manner that the anchorage of the glass fiber filler or insert within the thermoplastic materials is not impaired in any way. If the cold-hardening synthetic resin is poured or filled within the hollow space exclusively by the use of pressure, care must be taken, of course, to insure that the air present in the hollow space can escape before the synthetic resin completely fills it; therefore, the thermoplastic part must be brought into a position most suitable therefor.

The present invention is further illustrated by means of the attached drawing which shows the application thereof to the manufacture of a bathtub and hence will be further described hereinbelow according to this example.

Figure 3:
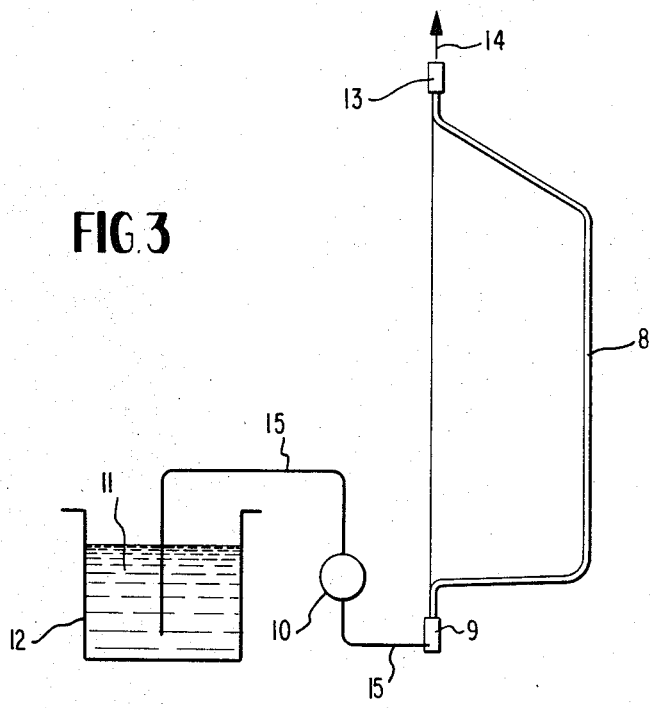

FIG. 3 schematically shows the introduction of a cold-hardening synthetic resin into the thermoplastic sheet combination.

Figure 1:
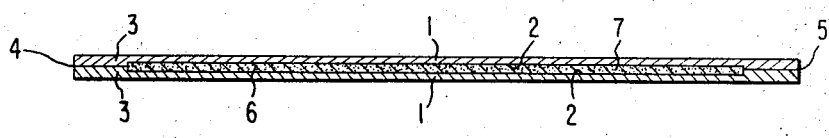
FIG. 1 shows a combination of thermoplastic materials at the beginning of the process of the present invention.

Referring to FIG. 1, the two mirror image-like sheets 1 of thermoplastic material, for example, molding-grade or unplasticized polyvinyl chloride, each provided with a recess 2 are contacted with one another all around and along the marginal strip 3, except for two openings (not shown). These sheets are intimately connected with each other at the edge 4 by means of the welding seam 5, which is interrupted only by the aforementioned openings. The hollow space 6 formed by the recesses 2 is filled with glass fiber insert 7, which may constitute, for example, a glass fiber mat, a glass fiber fleece, or the like.

Figure 2:
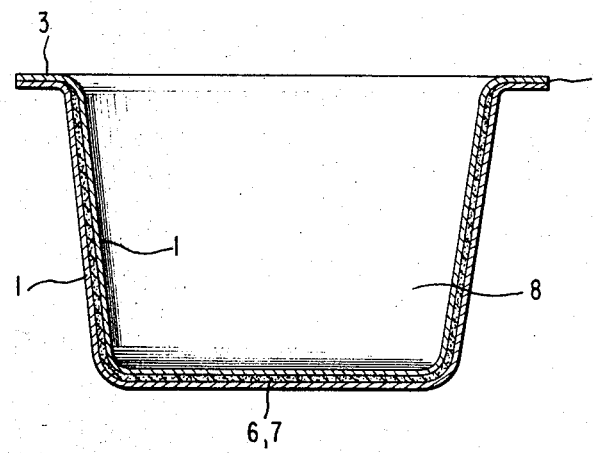
FIG. 2 illustrates the thermoplastic sheet combination of FIG. 1 after it has undergone a deep-drawing process to form a bathtub.

In accordance with FIG. 2, the thermoplastic combination of FIG. 1 is deep-drawn into the desired shape of the bathtub 8, after squeezing off or pressing at the inner surfaces, which have been transferred to a plastic or softened condition, of the two sheets 1 at a temperature below the softening or plastic range of the thermoplastic material. Accordingly, the dimensions as to thickness are correspondingly reduced as desired, and the marginal strip 3, not being filled with glass fibers, thereby forms the edge of the tub, which may also, if desired, be filled out with glass fibers.

In FIG. 3, the tub 8 is shown in an upright position for effecting the insertion of a synthetic resin thereinto. The pump 10 is connected, by means of line 15 to the lower opening provided as a filling vent or tube 9. Pump 10 effects the movement of cold-hardening synthetic resin 11 from the container 12 into the glass fiber-filled hollow space 6 (shown in FIGS. 1 and 2). As indicated by the arrow 14, the air present in the hollow space 6 may escape by way of the upper opening 13, which has also been adapted so as to form a vent or tube. However, it is also possible to connect the opening 13 to a vacuum pump in order to draw off the air. In that case, it would not be absolutely necessary to provide the tub 8 in an upright position as shown in FIG. 3. If a vacuum pump is utilized, it is further possible to connect the bathtub to the container 12 by means of the opening or vent 9, while omitting the pump 10, by way of line 15 so that the synthetic resin 11 is pulled or sucked into the hollow space 6 by means of the vacuum produced therein until said hollow space is completely filled.

There is no criticality in the use of any particular kind of glass fibers in the process of the present invention. It is to be understood that any of the glass fibers used in the prior art for the purpose of bonding or laminating may be utilized herein. The fibers need only be of such a length as to provide a good anchoring thereof in the thermoplast and the synthetic resin to be bonded. Glass fiber lengths of from about 25 to 50 mm. have been found to be highly desirable for use in the process of the present invention, but fibers having shorter or longer lengths may also be used effectively.

Moreover, the synthetic resin inserted into the hollow space formed between the thermoplastic materials may be any of those conventionally utilized as reinforcements in the prior art. The only requirement with respect to the synthetic resin utilized is that it be cold-hardening, i.e. hardens at low temperatures, and thus does not produce or require any higher temperature than the thermoplast can withstand without deformation or decomposition. These resins are well known in the art. Specific examples thereof are an epoxy resin or a polyester resin. As is well known in the art, epoxy resins are the condensation products of a polyhydric alcohol, such as bisphenol A or glycerol, with an epihalohydrin such as epichlorohydrin. Epoxy resins are described in detail in the prior art in, for example, U.S. Pat. 2,731,444 of Greenlee and at pp. 750–751 of the book by Noller, Chemistry of Organic Compounds, 2nd edition, W. B. Saunders Co., Philadelphia (1957). Polyester resins are well known in the art and are produced by the esterification of polybasic organic acids with polyhydric alcohols, as defined at p. 879 of the Condensed Chemical Dictionary, 5th edition, Reinhold Publishing Corporation, New York (1956). Such polyesters and other cold-hardening synthetic resins operative herein are described in detail in the prior art as, for example, in any of the recent editions of the Modern Plastic Encyclopedia.

A thermoplastic resin is one that may be softened by heat and which then regains its original properties upon cooling. Examples of such resins are polyvinyl chloride, copolymers of vinyl chloride with vinyl acetate (particularly containing from 2–15% vinyl acetate) and/or styrene or acrylonitrile, polyolefins such as polyethylene, polypropylene, polyisobutylene and copolymers of ethylene and propylene, polystyrene and acrylate and methacrylate resins. The particular thermoplastic resin utilized in the process of the present invention is not critical. However, polyvinyl chloride and the copolymers thereof are particularly preferred for use in the process of the present invention.

As stated above, the process conditions to be employed in the process of the present invention are not critical and are conventional in the art. Such conditions may be found in the prior art, e.g., Hülser, Kunststoffe, pp. 274–281 or, again, in any of the recent editions of the Modern Plastics Encyclopedia. In the case of polyvinyl chloride, temperatures of about 180° C. and pressing pressures of about 50 kg./cm.$^2$ were found to be particularly satisfactory. These conditions, of course, may be varied somewhat depending on the circumstances.

The invention being thus described, it will be obvious that the same may be varied in many ways. Such variations are not to be regarded as a departure from the spirit and scope of the invention and all such modifications are intended to be included in the scope of the following claims.

I claim:
1. A process for the preparation of a molded part of thermoplastic material having a glass fiber-synthetic resin reinforcement internal core, said thermoplastic material having the property of not directly adhering to the cold-hardening synthetic resin in a good adhesive bond which comprises contacting two essentially coinciding sections of thermoplastic material intimately together along the edges thereof, except for two openings therein, said essentially coinciding sections defining a hollow space therebetween, inserting glass fibers into said hollow space, subjecting the resulting glass fiber-filled thermoplastic material to a pressure at a temperature such that the surface of said thermoplastic material adjacent said glass fiber filler are softened, thereby anchoring the glass fiber filler in the thermoplastic material, cooling the then resultant glass fiber-filled thermoplastic material to a temperature below the softening point of said thermoplastic material, filling the glass fiber-filled hollow space with a cold-hardening synthetic resin and curing said cold-hardening synthetic resin without heat and pressure to produce said molded product having a glass fiber reinforcement core impregnated with cold-hardening synthetic resin, a continuous molded outer surface of said thermoplastic material and an inner surface of said thermoplastic material bonded to said synthetic resin by said glass fiber filler.

2. The process of claim 1, wherein said thermoplastic material is a polymer of vinyl chloride.

3. The process of claim 1, wherein said essentially coinciding sections of thermoplastic material are in the form of sheets.

4. The process of claim 1, wherein prior to said filling with a cold-hardening synthetic resin said glass fiber-filled thermoplastic material is deep-drawn to a desired shape.

5. The process of claim 1, wherein said filling with a cold-hardening synthetic resin is carried out by means of pressure applied over at least one of said openings.

6. The process of claim 1, wherein said filling with a cold-hardening synthetic resin is carried out by means of a vacuum applied over at least one of said openings.

7. The process of claim 1, wherein the edges of the two essentially coinciding sections of thermoplastic material intimately contacted together are sealed tight after the said step of inserting glass fibers into said hollow space but prior to the said step of filling the glass fiber-filled hollow space with a cold-hardening synthetic resin.

8. The process of claim 4, wherein said filling with a cold-hardening synthetic resin is carried out by means of a vacuum applied over at least one of said openings.

9. The process of claim 1, wherein one of said two openings is adapted as a filling vent for the connection of a filling device thereto and the other of said two openings is adapted as a suction vent for the connection of a vacuum device thereto.

10. The process of claim 1, wherein said cold-hardening synthetic resin is an epoxy resin.

11. The process of claim 1, wherein said cold-hardening synthetic resin is a polyester resin.

References Cited
UNITED STATES PATENTS

| | | | |
|---|---|---|---|
| 1,865,230 | 6/1932 | Bronson | 156—292 |
| 2,700,633 | 1/1955 | Bovenkerk | 156—292 X |
| 2,742,387 | 4/1956 | Givliani | 156—292 X |
| 2,794,756 | 6/1957 | Leverenz | 264—90 X |
| 3,077,000 | 2/1963 | Huisman et al. | |
| 3,183,143 | 5/1965 | Harris | 264—90 X |
| 3,116,986 | 1/1964 | Goeptfert et al. | 264—257 X |

ROBERT F. WHITE, Primary Examiner

T. J. CARVIS, Assistant Examiner

U.S. Cl. X.R.

264—249, 257, 263. 274; 156—322